United States Patent [19]

Vranken et al.

[11] Patent Number: 5,635,555
[45] Date of Patent: Jun. 3, 1997

[54] PVC-FREE COIL-COATED STEEL HAVING EXCELLENT CUT-SIDE CORROSION RESISTANCE

[75] Inventors: Paul Vranken, Zellik; Philippe Pigeolet, Corbais, both of Belgium

[73] Assignee: Fina Research, S.A., Seneffe, Belgium

[21] Appl. No.: 639,567

[22] Filed: Apr. 29, 1996

[51] Int. Cl.⁶ .................... C09K 167/02; B05D 3/00
[52] U.S. Cl. .................. 524/407; 427/327; 427/388.3; 524/590; 524/602; 524/604
[58] Field of Search .................. 524/407, 590, 524/602, 604; 427/327, 388.3

[56] References Cited

U.S. PATENT DOCUMENTS

| | | | |
|---|---|---|---|
| 4,501,829 | 2/1985 | Oda et al. | 524/539 |
| 4,752,532 | 6/1988 | Starka | 524/902 |
| 4,920,199 | 4/1990 | Jarzombsk et al. | 524/597 |
| 5,371,112 | 12/1994 | Sayre et al. | 524/604 |
| 5,484,842 | 1/1996 | Lewarchik et al. | 524/604 |

FOREIGN PATENT DOCUMENTS

| | | |
|---|---|---|
| 0385880A3 | 2/1990 | European Pat. Off. . |
| 0385880A2 | 3/1990 | European Pat. Off. . |

*Primary Examiner*—Veronica P. Hoke
*Attorney, Agent, or Firm*—Michael J. Caddell; M. Norwood Cheairs

[57] ABSTRACT

PVC-free coil coated steel having excellent cut-side corrosive resistance can be prepared by using on one or both sides a primer composition essentially consisting of a linear polyester of $Mn=3{,}000–15{,}000$, of acid number 0–10, and hydroxyl index 10–25; a blocked polyisocyanate, melamine or an urea-formaldehyde adduct, in an equivalent ratio of 0.8–4.0 to polyester; a catalyst; anti-corrosive pigments of the chromate type, being at least 50 weight percent of all pigments; and solvents.

9 Claims, No Drawings

PVC-FREE COIL-COATED STEEL HAVING EXCELLENT CUT-SIDE CORROSION RESISTANCE

BACKGROUND OF THE INVENTION

The present invention relates to the prevention of corrosion of coil-coated steel. More particularly, it relates to the prevention of cut-side corrosion using PVC-free coating compositions.

Coil-coated steel (often called pre-coated steel) is not coated on the cut sides, because it is cut after being coated. Corrosion can thus initiate at the cut sides, and progressively creep under the coating. Cut-side corrosion is a problem essentially in building uses, and to a lesser extent in white goods (refrigerators, washing machines and the like).

The best system presently known to prevent cut-side corrosion of coil-coated steel is based on polyvinylchloride (PVC) plastisol, and it is known that PVC is no longer considered as environmentally friendly for such use. An alternative solution is thus desired in the art, which should at least have equal resistance to cut-side corrosion.

It is an objective of the invention to provide a process for manufacturing PVC-free coil-coated steel having excellent cut-side corrosion resistance.

Another object of the invention is to provide a primer composition for a PVC-free coating system imparting excellent cut-side corrosion resistance of coil-coated steel.

Yet another object of the invention is to provide PVC-free coil-coated steel having excellent cut-side corrosion resistance.

These and other objects are provided by the invention as disclosed hereinafter.

SUMMARY OF THE INVENTION

The primer composition of the invention essentially consists of a binder system, one or more anti-corrosive pigments and one or more solvents.

The binder system consists of (a) a polyester resin having a number-average molecular weight of 3,000–15,000 (preferably 4,500–10,000, most preferably about 6,000), an acid index of 0 to 10 (preferably about 5) and a hydroxyl index of 10 to 25 (preferably about 15); (b) a cross-linking agent selected from blocked polyisocyanates (preferably having an isocyanide functionality of about 2), reelamine and urea-formaldehyde adducts; and (c) a suitable cross-linking catalyst.

DESCRIPTION OF THE PREFERRED EMBODIMENTS

The polyester resin used in the primer is an essentially linear polyester (i.e., prepared using less than 2% branched monomers). Raw materials selection and reactant amounts calculated as a function of desired properties is known in the art. (see e.g., Vol. III, pp. 81 ff. in "A Manual of Resins for Surface Coatings", M. J. Husbands et al., SITA, London, 1987) and need not be described herein.

Suitable cross-linking agents are known in the art and need also not be described herein.

The equivalent ratio of polyester resin to cross-linking agents is of from 0.8 to 4.0, preferably of from 1.0 to 2.0. Blocked cross-linking agents are preferably used, to prevent possible instability of the composition and/or interactions with pigments/fillers; the minimum cure temperature of blocked cross-linking agents is preferably between 50° C. and 150° C., most preferably between 60° and 80° C. The most preferred cross-linking agents is a blocked diisocyanate.

As known in the art, an appropriate cross-linking catalyst must be used, in an amount which must be sufficient to provide for complete reaction during the short heating time of coil coating processes.

The anti-corrosive pigments must be of the chromate type. The preferred chromates are strontium chromate (which is most preferred) and zinc chromate (or related compounds such as zinc tetroxy chromate). Calcium, strontium and zinc molybdates are less favorable alternatives.

At least 50 weight percent of all pigments in the primer must be of the chromate type, preferably at least 90 weight percent and most preferably 100 weight percent. Moreover, the pigment volume concentrate must be of 90 to 99% of the critical pigment volume concentration, preferably of more than 95% thereof; alternatively, the pigment to resin weight ratio must be of 0.5 to 1.2, preferably of about 1.

Usual solvents are also used, generally in an amount of 30 to 70 wt. % of the total composition, preferably 40 to 60 wt %, most preferably about 55 wt. %. The nature of the solvent is selected to have a good solvent power towards the polyester resin, the cross-linking component and the catalyst; a hydrocarbon solvent is generally used. The boiling range of the solvent must be suitable for the coil coating process; a boiling temperature or range between 120° C. and 220° C., preferably 150° C. to 200° C. is generally used. The amount of solvent is selected to obtain a primer having an appropriate viscosity for use in coil coating lines. The primer composition is then spread on a steel coil substrate to provide when cured, a film thickness of 0.005 to 0.03 mm, preferably about 0.015 min. The coating is cured by cross-linking, typically at a peak metal temperature (PMT) of from 220° C. to 280° C. The substrate speed is usually in the range of 100 to 200 m/min, typically of about 120 m/min.

It is preferred to apply a layer of primer on both faces of the steel coil, the use of a top coat on the back side being optional.

The primer composition of the invention is a universal primer composition, i.e., it can be used on substantially all pretreated steel substrates and can be covered with substantially all top coating compositions while having excellent adhesion and mechanical properties. More particularly, the primer composition of the invention can be used in combination with PVC-free top coating compositions to form PVC-free coating systems having excellent cut side corrosion resistance.

The inventors unexpectedly found that, by using the PVC-free coating systems of the invention, the top coating layer no longer had to have a 0.1–0.2 mm thickness as PVC plastisol did, but could have a thickness of about 0.02 mm while still having excellent or even improved cut side corrosion properties.

The invention will now be illustrated by the following examples.

EXAMPLE 1

The following primer paint composition was prepared:

| | |
|---|---|
| -polyester binder: | 19.5 parts by weight (pbw) |
|   -monomer composition:    20.93 pbw terephthalic acid | |
|                                2.11 pbw trimellitic anhydride | |
|                                52.08 pbw isophthalic acid | |
|                                14.46 pbw ethylene glycol | |
|                                23.53 pbw neopentyl glycol | |
|                                2.86 pbw 1,6-hexanediol | |
| -properties: | |
|   -hydroxyl number: 15 | |
|   -acid number: 5 | |
|   -number average molecular weight: 6,000 | |
| -blocked diisocyanate: | 2.3 pbw |
|   -equivalent weight: 378 | |
|   -minimum cure temperature: 333° C. | |
| -dibutyltin stearate: | 0.2 pbw |
| -strontium chromate: | 20.0 pbw |
| -polyacrylate additive (leveling agent): | 0.25 pbw |
| -polyisobutylacrylate | |
| -properties: | |
|   -acid number: max. 5 | |
|   -viscosity (23° C.): 47 dPa.s | |
| -ultrafine silicon dioxide powder (average 7 nm): | 0.3 pbw |
| -solvents: | 57.4 pbw |
|   of which | |
|   -commercial hydrocarbon solvent boiling at 150° C.: 19.5 | |
|   -id. at 200° C.: 15.0 | |
|   -alcohols (isobutanol, isopropanol, butylglycol, propylenemonoglycolether) | |
|   -esters (n-butyl and 1-methoxy-2-propyl acetates): 22.2 | |

EXAMPLE 2

In a coil coating line operating at 100 m/min, there were successively applied the following, each layer being cured by passing in an over at a PMT of 245° C.:

(a) on the front side
- a 0.015 mm dry thickness layer of the primer of Example 1; then
- a 0.02 mm dry thickness layer of a commercial polyester for outdoor use (SIGMATOP sold by SIGMA COATINGS);

(b) on the back side
- a 0.015 mm dry thickness layer of the primer of Example 1.

The substrate was 0.6 mm thick hot dip galvanized steel (HDG) with Bonder 1300 pretreatment.

The properties of the coating coil were evaluated as follows:

1. Erichsen stamping resistance: the plate is progressively stamped using a 20 mm diameter ball pressing from the uncoated side up to 8 mm diameter cracking of the coating is evaluated visually and using a 10× magnifying lens, and adherence is evaluated using TESA 4104 adhesive tape (TESA is a trademark of BDF-Beiersdorf):
- notation 10: no cracking, no adhesion failure;
- notation 9: cracking invisible with naked eyes, no adhesion failure;
- notation 8: slight cracking visible with naked eyes, no adhesion failure;
- notation 7: large cracking, no adhesion failure.

2. Zero T adherence: the plate is bent back upon itself so that no space remains between the bent layers of substrate, and the bent film is evaluated according to the above notation;

3. Intercoat adhesion: the coating is scraped using a coin, and the adherence on the primer is evaluated using the subjective notations 0 (bad), 5 (average) or 10 (good);

4. Cut side corrosion: the coated plate is submitted to 1500 hours salt mist, then the extent of corrosion is evaluated according to ECCA-T8 standard method and the corroded distance from the cut edge is expressed in min.

The results are mentioned in Table 1.

COMPARATIVE EXAMPLE A

A pre-coated steel plate was prepared as in Example 2, except as follows:

(a) on the front side
- a 0.005 mm dry thickness layer of commercial PVC-plastisol primer;

(b) on the back side
- a 0.007 mm dry thickness layer of commercial epoxy coating composition.

The results are mentioned in Table 1.

EXAMPLES 3 TO 6 AND COMPARATIVE EXAMPLE B

Pre-coated steel plates were prepared as in Example 2, except as mentioned in Table 1, wherein the test results are also mentioned. The primer coating composition of Comparative Example B was essentially identical to that of Example 1, except for the pigment composition which was a follows:

strontium chromate 11.4 wt. %
titanium dioxide 88.6 wt. %

TABLE 1

|  | Ex.2 | Ex.3 | Ex.4 | Ex.5 | Ex.6 | Comp.A | Comp.B |
|---|---|---|---|---|---|---|---|
| Front side | | | | | | | |
| primer | Ex.1 | id. | id. | id. | id. | prior art | id. |
| dry thickness (mm) | 0.015 | 0.015 | 0.015 | 0.005 | 0.005 | 0.005 | 0.005 |
| top coating | polyester | id. | id. | id. | id. | PVC | polyester |
| dry thickness (mm) | 0.02 | 0.02 | 0.02 | 0.02 | 0.02 | 0.1 | 0.02 |
| Back side | | | | | | | |
| primer | invention | id. | id. | id. | — | — | — |
| dry thickness (mm) | 0.015 | 0.015 | 0.005 | — | — | — | — |
| top coating | — | epoxy | — | — | epoxy | id. | id. |
| dry thickness (mm) | — | 0.007 | — | — | 0.007 | 0.007 | 0.007 |
| Properties | | | | | | | |
| Erichsen 8 mm | 10 | 10 | 10 | 10 | 10 | 10 | 10 |
| OT adhesion | 10 | 10 | 10 | 10 | 10 | 10 | 10 |
| intercoat adhesion | 10 | 10 | 10 | 10 | 10 | 10 | 10 |
| cut-side corrosion | 0 | 0 | 2 | 4 | 9 | 10 | 15 |

We claim:

1. Primer coating composition essentially consisting of
   (i) a binder system consisting essentially of:
      (a) an essentially linear polyester resin having a number-average molecular weight of 3,000 to 15,000, a acid number of 0 to 10 and a hydroxyl index of 10 to 25;
      (b) a cross linking agent selected from the group consisting of block polyisocyanates, melamine and urea-formaldehyde adducts, the equivalent ratio of polyester resin to cross linking agent being of from 0.8 to 4.0; and
      (c) a suitable cross linking catalyst;
   (ii) at least one anti-corrosive chromate pigment, the amount of anti-corrosive pigment being at least 50 weight percent of all pigments in the composition, and the pigment volume concentration being 90 to 99% of the critical pigment volume concentration; and
   (iii) at least one solvent.

2. The primer according to claim 1, wherein the polyester has a number-average molecular weight of 4,500 to 10,000.

3. The primer according to claim 1, wherein the polyester has an acid number of about 5 and a hydroxyl number of about 15.

4. The primer according to claim 2, wherein the polyester has an acid number of about 5 and a hydroxyl number of about 15.

5. The primer according to any one of claims 1–4, wherein the cross linking agent is a blocked diisocyanate.

6. A primer according to any one of claims 1–4, wherein the equivalent ratio of polyester resin to cross linking agent is about 1 to 2.

7. A primer according to any one of claims 1–4, wherein strontium chromate is used as the anti-corrosive pigment.

8. A primer according to any one of claims 1–4, wherein anti-corrosive pigments represent at least 90 weight percent of all pigments in the composition, the pigment to resin weight ratio being about 1.

9. A process for coil coating steel, characterized by the use of a coating composition according to any one of claims 1–4.

* * * * *